United States Patent [19]

Maeda et al.

[11] Patent Number: 4,872,072
[45] Date of Patent: Oct. 3, 1989

[54] VIDEO SYSTEM

[75] Inventors: Masaya Maeda; Hiroyuki Takimoto; Susumu Kozuki, all of Kanagawa, Japan

[73] Assignee: Canon Kabushiki Kaisha, Tokyo, Japan

[21] Appl. No.: 197,563

[22] Filed: May 23, 1988

Related U.S. Application Data

[60] Division of Ser. No. 153,463, Feb. 1, 1988, which is a continuation of Ser. No. 57,714, Jun. 1, 1987, abandoned, which is a continuation of Ser. No. 729,682, May 2, 1985, abandoned, which is a continuation of Ser. No. 351,605, Feb. 23, 1982, Pat. No. 4,531,164.

[30] Foreign Application Priority Data

Feb. 26, 1981 [JP] Japan .................................. 56-27140
Mar. 6, 1981 [JP] Japan .................................. 56-32106
Mar. 6, 1981 [JP] Japan .................................. 56-32107
Jun. 24, 1981 [JP] Japan .................................. 56-97913

[51] Int. Cl.⁴ .............................................. H04N 5/78
[52] U.S. Cl. ................................... 360/33.1; 358/906
[58] Field of Search ............... 358/310, 335, 906, 909; 360/33.1, 35.1; 369/11, 12, 76

[56] References Cited

U.S. PATENT DOCUMENTS 4,232,329 11/1980 Horak et al. ......................... 358/906
4,470,135 9/1984 Osanai .................................... 369/11
4,507,686 3/1985 Kimura ............................... 358/310

Primary Examiner—Donald McElheny, Jr.
Attorney, Agent, or Firm—Toren, McGready & Associates

[57] ABSTRACT

A video system comprising a video camera and a recording device to record video signals obtained by the video camera, wherein the recording device starts functioning with a plurality of different delay times based on operating instructions to the video camera.

8 Claims, 5 Drawing Sheets

FIG.7

| | 36 | 38 | 39 | Pt.d | Pt.e | Tr1 | Tr2 | Tr3 | Tr4 | Tr5 | Tr6 | 37 |
|---|---|---|---|---|---|---|---|---|---|---|---|---|
| 1 | a | OFF | OFF | H | L | ON | OFF | OFF | ON | ON | OFF | REVERSE |
| 2 | a | OFF | ON | L | L | OFF | OFF | OFF | OFF | OFF | OFF | 0 |
| 3 | a | ON | OFF | H | L | ON | OFF | OFF | ON | ON | OFF | REVERSE |
| 4 | a | ON | ON | L | L | OFF | OFF | OFF | OFF | OFF | OFF | 0 |
| 5 | b,c | OFF | OFF | L | H | OFF | ON | ON | OFF | OFF | ON | NORMAL |
| 6 | b,c | OFF | ON | L | H | OFF | ON | ON | OFF | OFF | ON | NORMAL |
| 7 | b,c | ON | OFF | L | L | OFF | OFF | OFF | OFF | OFF | OFF | 0 |
| 8 | b,c | ON | ON | L | L | OFF | OFF | OFF | OFF | OFF | OFF | 0 |

VIDEO SYSTEM

This is a division of application Ser. No. 153,463, filed Feb. 1, 1988, which in turn is a continuation of Ser. No. 057,714, filed June 1, 1987, abandoned, which in turn is a continuation of Ser. No. 729,682, filed May 2, 1985, abandoned, which in turn is a continuation of Ser. No. 351,605, filed Feb. 23, 1982, now U.S. Pat. No. 4,531,164, issued July 23, 1985.

BACKGROUND OF THE INVENTION:

1. Field of the Invention:

The present invention relates to a video system, particularly to a video system which uses a small size cassette for reducing a size and a weight of a video tape recorder and is chiefly intended for use in a photographing.

2. Description of Prior Arts:

A conventional type of video system is shown in FIG. 1. In this drawing, what is shown as 1 is a video camera, and 2 is a VTR, while 3 is a cable. An image photographed by the video camera 1 is converted into NTSC signal by the camera then is sent through the cable 3 to the VTR 2. The VTR 2 converts said NTSC signal, at a time of a reproduction, into a signal which can be reproduced with a television set by a built in RF conversion system.

This type of VTR used in a portable video system has such function to record images at a magnetic tape within a magnetic tape cassette and reproduce the image out of said tape. And as an image recording signal therefor, NTSC signals from a video camera and NTSC signals from a television broadcasting station are used. Also output signals reproduced in this type of video system are VHF signals obtained by a frequency modulation of the NTSC signals to VHF band, so that they can be reproduced at a home use TV set having no video input terminal using one of the channels of said TV set. As a VTR having such reproduction function, contains a servo-system for reproduction, a power source, a device to convert reproducing signals to NTSC signals, and an RF conversion system to make a frequency modulation for the NTSC signals, such problems are unavoidable as inconvenience in a portable characteristic and a maneuverability in respect to a size and a weight, etc. of a VTR itself.

Also as a conventional video tape recorder, such system has been known that after a power source switch is put in before a recording is started, a recording button or a reproduction button is pressed to take out a tape out of a cassette and the tape is wound around a cylindrical tape guide having a rotating head being built in the same (hereinafter called as loading), then said loading is stopped by an output of a loading completion detecting switch. Also as a stop button is pressed upon completion of a recording, the above-mentioned recording or reproduction button is reset. At this time, a function to separate the tape from the cylindrical tape guide and house the same in the cassette (hereinafter called as unloading) is carried out. This function is carried out only when unloading completion detecting switching has not detected an unloading completion and the stop button is pressed.

However, when such complicated arrangement is employed, not only a mechanism within a video tape recorder becomes complicated but there will be many elements not being necessary for operating the system, thus being detrimental in reducing a size and a weight of the system.

SUMMARY OF THE INVENTION:

The present invention is made in view of the above-mentioned shortcoming of the conventional example for providing a unique video system.

In particular, it is an object of the present invention to provide a video system comprising a VTR having a recording function on a recording medium and a video camera having a photographing function, and is to reduce a size and a weight of a total system and to improve a handling characteristic.

It is further another object of the present invention to provide a video system in which a reproduction unit to make a reproduction from a VTR is added to the VTR and the video camera.

Still other objects than what is mentioned above of the present invention will be made clear by the following detailed explanation of the present invention together with the drawings attached hereto.

BRIEF DESCRIPTION OF THE DRAWINGS:

FIG. 7 is a truth table to show an operating state of the motor shown in FIGS. 6(a) and 6(b).

Figure 1:
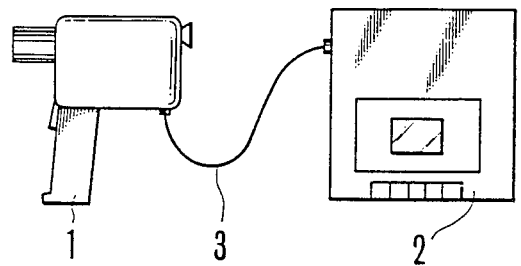
FIG. 1 is a front elevation to show a conventional video system.
Figure 2A:
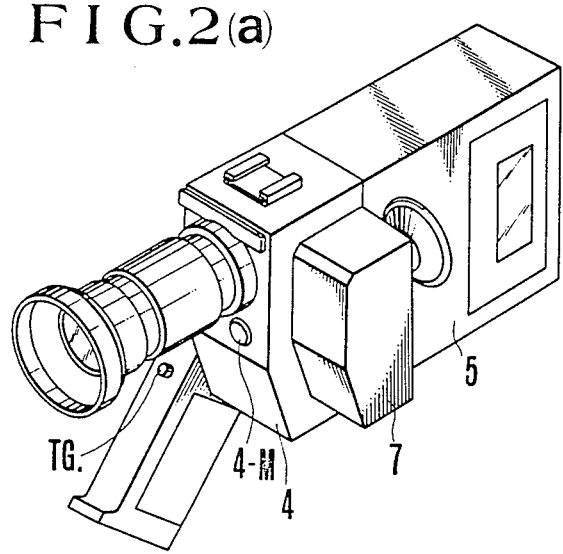
FIGS. 2(a) and (b) are drawings to show an example of the present invention.

DETAILED DESCRIPTION OF THE PREFERRED EMBODIMENTS:

FIGS. 2(a) and (b) show an example of the present invention, a video system chiefly comprising a video camera 4, a VTR 5, a reproduction unit 6. The VTR 5 is so made as having mainly a recording function and a reproduction mechanism, a power source circuit (AC power source) and a system control mechanism, etc. are housed within a reproduction unit 6.

FIG. 2(a) is an oblique view to show the VTR 5 and the camera 4 in a combined state, wherein 4-M is a microphone, 7 shows an electronic view finder, while TG represents a trigger switch to instruct a starting of a photographing.

Figure 2B:
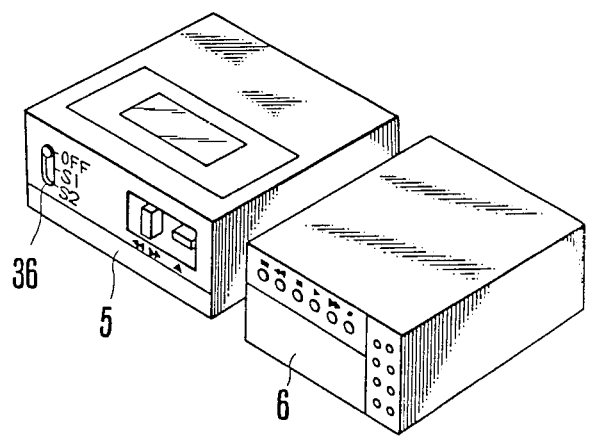

FIG. 2(b) shows the VTR 5 and the reproduction unit 6 as being combined at a time of reproduction, wherein the VTR 5 and the reproduction unit 6 may be combined either by a cable connection or by a mechanical connection with a connector such as a hot shoe, etc.

Figure 3:
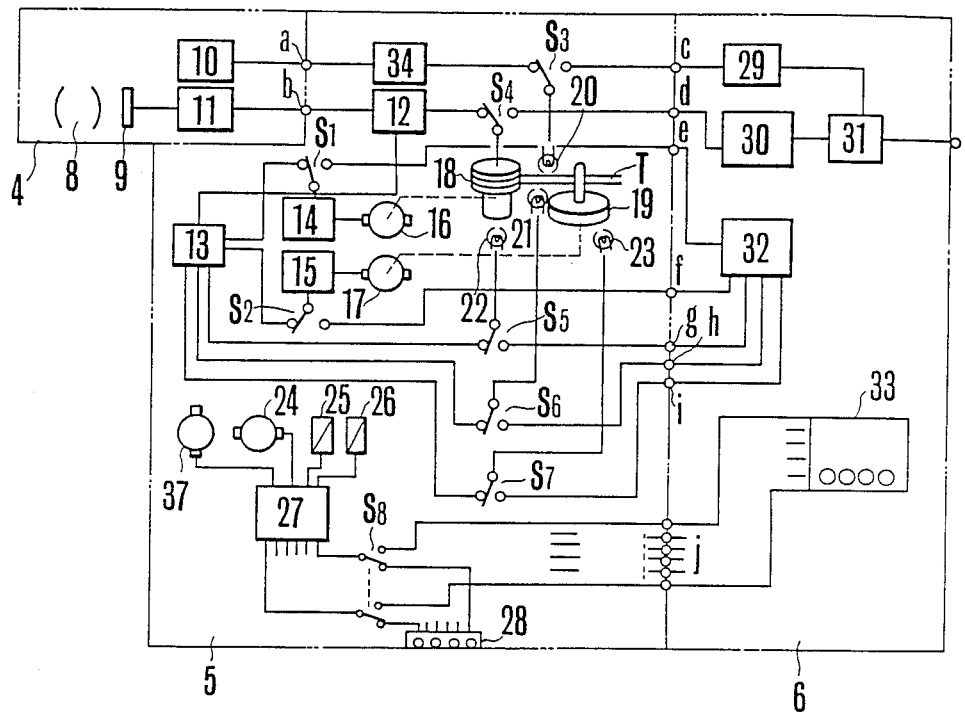
FIG. 3 is a circuit diagram in each of units shown in FIGS. 2(a) and 2(b).

FIG. 3 shows a block diagram for a circuit in each of the units of the present invention. Video signals are produced by an optic 8, an image pickup element 9 and a camera signal processing circuit 11 within the video camera 4 and are output to a terminal b. And sound signals obtained by the microphone 4-M of FIG. 2(a) are output to a terminal a through a pre-amplifier 10. The sound signals and the video signals thus obtained go through a sound recording amplifier 34 and a video signal recording circuit 12 respectively and are recorded on a magnetic tape T by a sound head 20 and a rotating magnetic head or heads (not being shown in the drawing) provided on a cylindrical tape guide 18 (hereinafter called as a drum). At this time, a recording servo circuit 13 controls a rotation of a drum motor 16 in a phase synchronism with synchronizing signals of recording video signals to control a capstan motor 17 for causing the same to run with a constant speed. The above-mentioned rotating magnetic head consecutively records video signals on slant track on the tape T being wound obliquely around the drum 18. The sound head records sound signals at an edge of the tape T in a traverse direction thereof. At the same time control signals (hereinafter called as CTL) corresponding to a frame frequency of the video signals are recorded at the other edge of the tape T, thus forming a control track.

Detection heads 22 and 23 are to detect a number of rotations and a rotating phase of the rotating head and a capstan roller 19, respectively. Outputs of the detection heads 22 and 23 are fed back to the recording servo circuit 13 through switches S5 and S7. What are shown as 14, 15 are driving circuits respectively for the drum motor 16 and the capstan motor 17, wherein servo error signals, etc. are supplied from the recording servo circuit 13 at a time of recording. What is shown as 27 is a system control circuit, that is a circuit block to control a reel motor 24, a loading motor 37, a pinch roller solenoid 25, a shut off solenoid 26, etc. in correspondence with an operation of an operating part 28 of the VTR, to make a recording, a fast forwarding, a quick return, and to set a mode for a loading and an unloading which are conventionally known in a VTR and an audio tape recorder.

Figure 4:
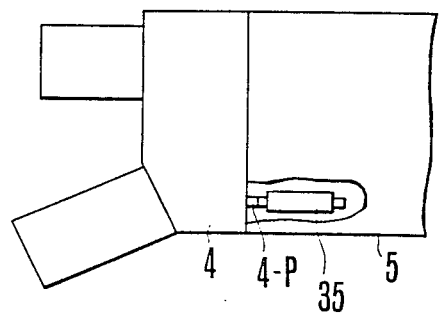
FIG. 4 is a partially broken sketch of the video system shown in FIG. 3 to explain a change over of switches S1 to S8 in FIG. 3.

As the camera 4 and the VTR 5 are combined at a time of recording, recording-reproducing mode change over switches S1, S2, S3 ... S8 are to be changed over to a side shown by solid lines in FIG. 3. That is, in FIG. 4, a change over switch 35 is so made that the mode changer over switches S1 to S8 are housed within the switch 35 and are to be changed over as mentioned above when being pressed by a projection 4-P provided at the camera. A recording-reproducing mode change over which requires change overs of a number of circuits can be done easily and surely by said arrangement and at the same time, a recording mode can be set by connecting the camera to the VTR, thus there will be no failures in the change over.

Also these change over switches S1 to S8 are changed over from their put in positions to the other side in FIG. 3 as the camera 4 are separated from the VTR 5 and the VTR 5 is combined with the reproduction unit 6. At the same time, the VTR 5 and the reproduction unit 6 are combined, their circuits are connected through connection terminals c to j.

What is shown as 29 at the reproduction unit 6 is a sound reproduction circuit, and 30 is a video signal reproduction circuit, while 31 is an RF converter, and 32 is a reproduction servo circuit, while 33 is a system control part.

Next, explanations will be made for a function and an operation of the VTR 5 at a time of photographing referring to FIG. 6(a).

Figure 6A:
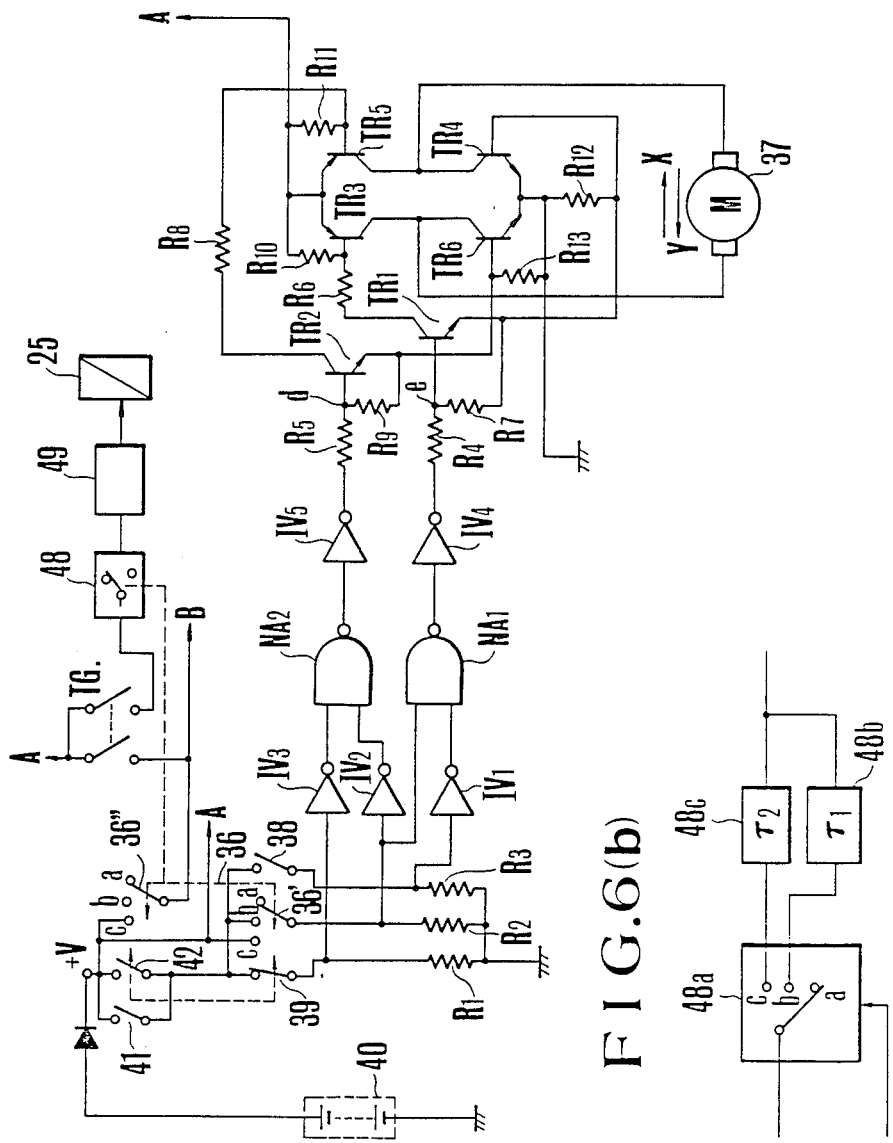
FIGS. 6(a) and 6(b) are a control circuit diagram of a loading motor.

FIG. 6(a) is a circuit connection diagram to show an arrangement of a loading motor control circuit within the system control part 27 of FIG. 3. What is shown as 38 is a switch to be put in when a tape loading is completed, and 39 is a switch to be put in when a tape unloading is completed, while 42 is associated with the switch 39 and is opened when the switch 39 is closed. Also, 36 is a power source switch provided at the VTR 5 as shown in FIG. 2 and is operated from outside, having three positions, OFF, a stand-by 1 and a stand-by 2. This power source switch 36 comprises associated switches 36' and 36" being so made as consecutively changed over to contacts a, b and c. When the power source 36 is at the OFF position, the switches 36', 36" are connected to the contact a, and when a cassette is loaded into the VTR 5 and the power source switch 36 is set at the stand-by 1, the associating switches 36', 36" are respectively connected to the contact b, while they are connected to the contact c as the power source switch 36 is set at the stand-by 2. What is shown as 41 is a switch which is opened only when the switch 36 is contacting the contact a that is at its OFF position, and is closed at any other time.

The above-mentioned three switches, 36, 38 and 39 being connected in parallel will be grounded through resistors R1, R2 and R3 at one ends when they are connected to + side of a power source at the other ends, so that high level signals (hereinafter called as "H") can be obtained with the switches ON and low level signals (hereinafter called as "L") can be obtained with the switches OFF at their respecting connecting points within the resistors R1, R2 and R3.

What are shown as IV1, IV2 and IV3 are inverters to invert signals obtained corresponding to ON, OFF of switches 38, 36 and 39 respectively, and NA1 is a NAND gate to receive an output of the inverter IV1 and a signal obtained at a connecting point between the power source switch 36 and the resistor R2. And NA2 is a NAND gate to receive outputs of the inverters IV2 and IV3, and what are shown as IV4 and IV5 are inverters to invert outputs of the NAND gates NA1 and NA2 respectively. Outputs of said inverters IV4 and IV5 will be added to respective bases on npn switching transistors TR1 and TR2 through resistors R4 and R5.

Here, a collector side of the transistor TR1 is connected to a base of a pnp switching transistor TR3 through a resistor 6 and its emitter side is connected to a base of an npn switching transistor TR4 placed at a diagonal position against the transistor TR3 and at the same time is connected to a base of itself through a resistor R7.

On the other hand, a collector side of the transistor TR2 is connected to a base of a pnp switching transistor TR5 through a resistor R8, also its emitter side is connected to a base of an npn switching transistor TR6 placed at a diagonal position against the transistor TR5, and at the same time is connected to a base of itself through a resistor R9. Also, emitter sides and bases of the transistors TR3 and TR5 are connected to a power source path A (the bases being through resistors R10 and R11 respectively), and emitter sides and bases of the transistors TR4 and TR6 are grounded (the bases being through resistors R12 and R13, respectively). And the above-mentioned loading motor 37 is insertedly connected between a collector connection point of the transistors TR5 and TR4 and a collector connecting point of the transistors TR3 and TR6.

Figure 5A:
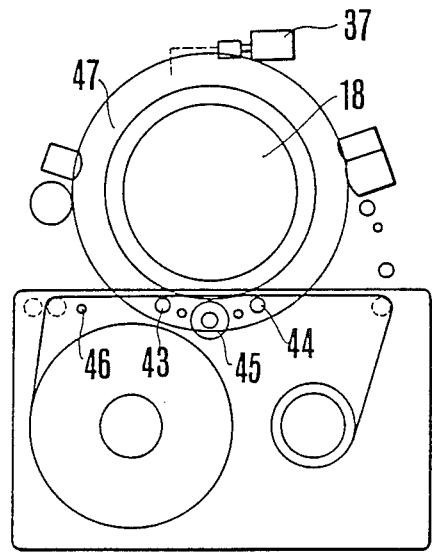
FIGS. 5(a) and (b) are drawings to show an unloading state and a loading state of a tape.
Figure 5B:
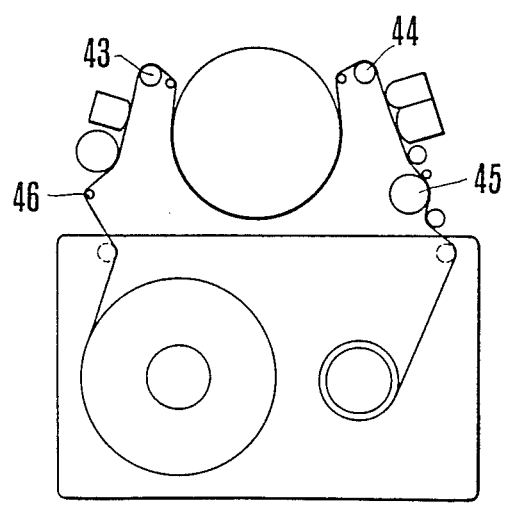

In such an arrangement, when the power source switch 36 is made ON by a stand-by operation under a tape unloading completion state, an output of the NAND gate NA1 becomes "L", while an output of the NAND gate NA2 is left in "H", that is, an output of the inverter IV5 is left in "L". Therefore an output of the inverter IV4 becomes "H", and the transistor TR1 has power supplied thereto by this, then the transistors TR3 and TR4 also have power supplied thereto. Therefore power flows to the loading motor 37 in the direction of an arrow X, and said motor 37 makes a normal rotation, thus a taking out of the tape will be done. That is, pull out pins 43, 44 and 46 and a pinch roller 45 positioned within the tape cassette as shown in FIG. 5(a) are shifted in an association with a loading ring 47 being driven by the loading motor 37. A state at which said shifting has been completed is shown in FIG. 5(b). The loading completion switch will be closed at the state shown in FIG. 5(b).

And as the tape loading completion detecting switch 38 becomes ON as mentioned above at the loading completion position, an output of the NAND gate NA1 becomes "H" by this. Therefore, an output of the inverter IV4 becomes "L" and the transistor TR1 is placed in a non-conductive state, then the transistors TR3 and TR4 are both placed in a non-conductive state. Thus the motor 37 is stopped. As mentioned above a loading action is carried out only by placing the power source switch at the VTR side is made ON, not depending on an instruction from the camera side. Thus a photographer can concentrate his attention to a photographing.

On the other hand, as the power source switch 36 is made OFF under the tape loading state when a photographing is completed, the switch 41 is opened in an association therewith. Since the tape unloading completion detecting switch 39 is placed in OFF state at this time, an output of the NAND gate NA2 becomes "L" while an output of the NAND gate NA1 is left in "H", that is an output of the inverter IV4 if left in "L". Therefore, an output of the inverter IV5 becomes "H" and power is supplied to the transistor TR2 thereby, thus power is supplied to the transistors TR5 and TR6 and current flows to the loading motor 37 in the direction of an arrow Y causing the motor 37 to make a reverse rotation. And when the tape unloading completion detecting switch 39 becomes ON at the tape unloading completion position, an output of the NAND gate NA2 becomes "H" by this. Therefore, an output of the inverter IV5 becomes "L", thus the transistor TR2 is placed in a non-conductive state. Therefore, the transistors TR5 and TR6 are placed in a non-conductive state and the motor 37 is stopped. Thus, a loading will be done by a normal rotation of the motor 37 and an unloading into the cassette will be done by a reverse rotation of the same.

As has been mentioned above, as the power source switch is returned to OFF position the switch 36 is opened (i.e. being ON at the contact a) and the switch 41 is opened in an association therewith. Further, the loading motor makes reverse rotation until the unloading switch 39 is closed and the switch 39 is closed upon a completion of the loading, then the switch 42 is opened in an association with the switch 39, placing the power source in a completely OFF state.

A state of the switches 36, 38, 39 and an ON. OFF relationship of the transistors TR1 to TR6 are shown in FIG. 7.

At this time, under a stand-by 1, power is not supplied to a power source path B which supplies power to other circuits such as a processing system and a servo system, etc. And when the camera trigger switch TG which instracts a starting of a recording is operated, power is supplied to said circuit systems from the power source path A through the power source path B. After the trigger switch TG is made ON, a power supply to a driving circuit 49 of the pinch roller pressing solenoid 25 which presses the pinch roller against the capstan 19 is delayed by a time interval $\tau 1$ by a delay circuit 48. By this arrangement a circuitwise and mechanical delay of the drum motor 16 and the capstan 17 are provided. Further, a start of a recording after the trigger switch Tg is made ON that is after a release is somewhat delayed, but power consumption can be reduced. That is, it is effective in the mode of the stand-by 1 when a non-photographing interval is comparatively long.

In the mode of the stand-by 2, since the switch 36" is connected to the contact c, the drum motor 16 and the capstan motor 17 are always rotating under said mode. And since a delay time of the delay circuit 48 is set at $\tau 2$ which is shorter than the internal $\tau 1$, the pinch roller pressing solenoid 25 works immediately after the trigger switch TG is made ON, and a recording is started. Thus the stand-by 2 mode is effective for a photographing of a scene in which a timing of photographing is a keen factor.

Figure 6B:
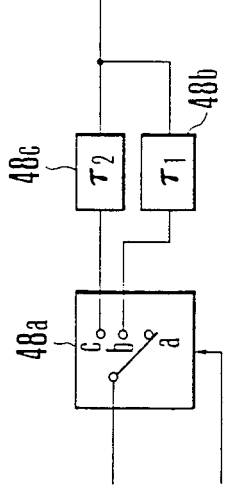

Details of the delay circuit 48 is shown in FIG. 6(b). In FIG. 6(b), 48a is an analog switch which is connected to a contact a when the switch 36 is at OFF position and is connected to a contact b when the switch 36 is at the stand-by mode 1, then is connected to a contact c at the time of the stand-by 2 mode. What is shown as 48b is a delay circuit with the delay time $\tau 1$ and 48c is a delay circuit with the delay time $\tau 2$. As mentioned above delay times are selected depending on the stand-by 1 mode and the stand-by 2 mode so that a selection of a stand-by mode suitable for a photographing object can be made.

Next, explanations will be made on a function at the time of reproduction.

At a time of reproduction, the camera is separated from the VTR and the reproduction unit 6 combined. When said latter combination is made the system control block 27 is controlled by an operating part 33 of the reproduction unit 6 electrically or mechanically. Therefore all operating functions will be placed at the reproduction unit side. Thus a user can concentrate his attention to the reproduction unit without any hesitation.

Further, as the camera 4 is separated from the VTR, the recording-reproducing mode setting switches S1 to S7 are changed over to the other side of what is shown in FIG. 3 for recording. Therefore, video signals and sound signals recorded in the tape go through the switches S4, S3, respectively and through the video signal reproduction circuit 30 and the sound reproduction circuit 29 and are converted to RF signals in VHF band by the RF converter 31, and are reproduced in a TV set. Also the reproduction servo circuit 32 is provided at the reproduction unit side and obtains TACH pulses, reproduction CTL signals and capstan FG output, etc. obtained from the switches S5, S6, S7, thus making a reproduction tracking servo operation.

As has been explained above in detail, an arrangement that a loading is done automatically by removing the power source switch from its OFF position is employed in the present invention, thus its handling characteristics is improved and a structure thereof is simplified.

Also, when the above-mentioned power source switch is placed in other positions than OFF position, a mode to make power supply to a rotating system and a mode not to make the same are available and delay circuits having different delay times are respectively provided for each mode, thus a trigger can be made with due consideration being made for a start up time of the rotating system.

Also such arrangement is employed that a detection means to detect an unloading completion is provided and as the power source is made OFF an unloading completion signal can be obtained from said detection means so that an unloading is automatically made, thus its handling and operation can be made very easily.

Further, such arrangement is employed that power supply to circuits related to a loading is maintained even if the power source is made OFF until said unloading is completed, and the power supply is automatically stopped by a completion of an unloading, therefore a handling characteristic is further improved and power saving can be made without any particular efforts.

Also, in a video system of the present invention, a VTR which is combined to a video camera for making a photographing is made of parts containing a recording mode only, therefore a camera and a VTR is integrally made thus a reduction in size and weight can be achieved.

Further, since a VTR is made to have as small size as possible for having the minimum function needed solely for a recording, when the VTR is combined with a video camera a burden on a user at a time of photographing can be reduced to the minimum, thus a handling characteristic is further improved and it will be easy to carry the same around.

Further, as the camera is removed from the VTR, the VTR is automatically changed over to a reproduction mode and it is combined with a reproduction unit so that a function in a reproduction mode can be obtained without delay, thus it is a very convenient device as a simple video system.

Also, a VTR in the present invention can naturally be combined with other video sources (for example, a tuner for television signal, etc.) for making a video recording without using a video camera. That is if a same projection as that provided at the video camera is provided at a unit to connect other video sources to the VTR of the present invention, said projection can be attached to an input of the VTR for automatically changing over the VTR to a recording mode.

While explanations of the present invention have been made in the above, taking a video camera and a VTR as an example, the invention can be applied to a disk type recording apparatus to make a recording on a disk shape material, etc.

Also, various other applications and modifications are possible for the present invention within the scope of the claims attached hereto.

What is claimed is:

1. An information signal recording and reproducing system, comprising:
    (A) a first apparatus including:
        (a) a recording and reproducing head;
        (b) a switch which is connected to said head and can take a first state for making said head perform a recording and a second state for making said head perform a reproducing;
        (c) a recording circuit for processing an information signal inputted therein and supplying the information signal as a recording signal to said head through said switch in the first state;
        (d) moving means for relatively moving a recording medium and said head; and
        (e) first control means for controlling said moving means when said switch is in the first state; and
    (B) a second apparatus which can be electrically and mechanically attached to and detached from said first apparatus, including:
        (a) a reproducing circuit which has a signal reproduced at said head inputted therein through said switch in the second state, said reproducing circuit processing the reproduced signal for outputting the reproduced signal as a reproduced information signal; and
        (b) second control means for controlling said moving means when said switch is in the second state.

2. A system according to claim 1, wherein said switch is so arranged as changing over said first state and second state depending on an attaching and a detaching of said first apparatus and second apparatus.

3. A system according to claim 1, wherein said head is a rotating head.

4. A system according to claim 3, wherein said information signal includes a video signal.

5. A system according to claim 3, wherein said recording medium is a tape-shaped medium, and said moving means includes shifting means for shifting said tape-shaped medium in the longitudinal direction thereof and rotating means for rotating said rotating head.

6. A system according to claim 1, wherein said first apparatus further includes a first manual operation member for instructing said head to start a recording, and said first operation member cannot instruct said head to start a reproduction.

7. A system according to claim 6, wherein said second apparatus further includes a second operation member for instructing said head to start a reproduction.

8. An information signal recording and reproducing system, comprising:
    (A) a first apparatus including:
        (a) a recording and reproducing head;
        (b) a switch which is connected to said head and can take a first state for making said head perform a recording and a second state for making said head perform a reproduction;
        (c) a recording circuit which processes an information signal inputted therein and supplies the information signal as a recording signal to said head through said switch in the first state;
        (d) moving means for relatively moving a recording medium and said head;
        (e) a first operating member for instructing said head to start a recording, said first operating member being unable to instruct said head to start a reproduction; and
    (B) a second apparatus which can be electrically and mechanically attached to and detached from said first apparatus, including:
        (a) a reproducing circuit which has a signal reproduced at said head inputted therein through said switch in the second state and processes the reproduced signal then outputs its as a produced information signal; and
        (b) a second operation member for instructing said head to start said reproducing.

* * * * *